United States Patent Office 3,536,694
Patented Oct. 27, 1970

3,536,694
TETRACYANO CYCLOPENTADIENE COMPOUNDS CONTAINING AN AZO GROUP AND METHODS OF PREPARATION
Owen Wright Webster, Wilmington, Del., assignor to E. I. du Pont de Nemours and Company, Wilmington, Del., a corporation of Delaware
No Drawing. Continuation-in-part of application Ser. No. 255,068, Jan. 30, 1963. This application Oct. 27, 1967, Ser. No. 678,536
Int. Cl. C07c *107/00, 113/00;* C09b *29/00*
U.S. Cl. 260—192          13 Claims

ABSTRACT OF THE DISCLOSURE

Cyclopentadienes in which at least four of the ring carbons carry cyano substituents, derivatives thereof including cyano, azobis-, amino-, halo-, mercapto-, nitro-, phenyl-, p-hydroxyphenyl-, carboxy-, azido- and azoaryl are claimed. Cyclization of hexacyanobutenediide in aqueous, acid gives 1-amino-2,3,4,5,5-pentacyanocyclopentadiene which is converted by nucleophiles into aminotetracyanocyclopentadienide zwitterion which in turn can be converted into diazotetracyanocyclopentadiene which yields derivatives by substitution, coupling and addition reactions typical of aryl diazonium compounds.

The compounds are useful as rocket thrust-producing propellants and the azoaryls are useful as dyes.

CROSS-REFERENCE TO RELATED APPLICATION

This application is a continuation-in-part of my coassigned application, Ser. No. 255,068, filed Jan. 30, 1963, now abandoned.

BACKGROUND OF THE INVENTION

This invention is related to a novel class of cyanocyclopentadienes in which at least four of the ring carbons carry cyano substituents and to methods for their preparation.

SUMMARY OF THE INVENTION

This invention is directed to cyanocyclopentadiene compounds in which at least four ring carbon atoms carry substituents, said compounds being members of the class consisting of (I) 1-amino-2,3,4,5,5-pentacyanocyclopentadiene, (II) a compound of the formula

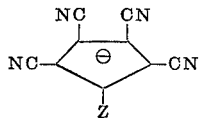

wherein Z is selected from the class consisting of

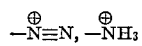

and

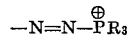

wherein R contains up to and including 20 carbon atoms and is selected from the class consisting of alkyl and aryl, and (III) a compound of the formula

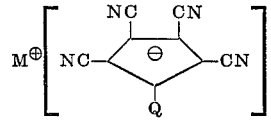

wherein $M^\oplus$ represents one equivalent of an ion selected from the class consisting of hydrogen ion, metal ion, ammonium ion, and $C_{1-20}$ alkyl-substituted ammonium ion and Q is selected from the class consisting of hydrogen, amino, cyano, hydroxy, carboxy, alkoxycarbonyl wherein the alkoxy portion thereof contains up to and including 20 carbon atoms, azobis, cyano azo, halogen, $C_1$–$C_{20}$ alkyl, aryl of up to and including 20 carbon atoms, p-hydroxyphenyl, nitro, azido, mercapto, (anionic)sulfonatoazo and $-N=N-R^1$ where $R^1$ is a group selected from the class consisting of

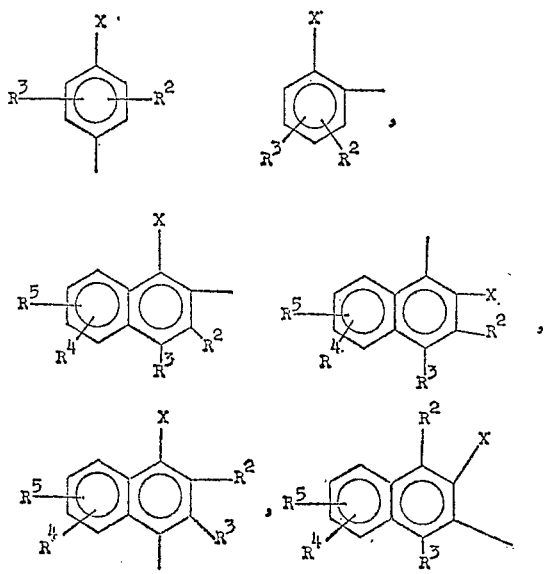

and

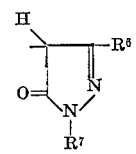

where X is hydroxy, lower alkoxy or $-NR^8R^9$; $R^2$, $R^3$, $R^4$ and $R^5$ are hydrogen, lower alkyl, —CN, halogen, hydroxy, —COOM, $-SO_3^\ominus M^\oplus$, $-NR^8R^9$,

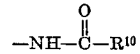

trifluoromethyl, $-SO_2NH_2$ or $$-NH-\overset{O}{\underset{\|}{C}}-R^{10}$$

$R^6$ is lower alkyl; $R^7$ is hydrogen, lower alkyl, hydroxylower alkyl,

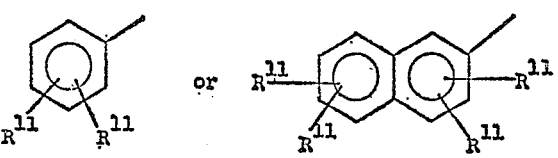

$R^8$ and $R^9$ are hydrogen, lower alkyl, hydroxylower alkyl, cyanolower alkyl or phenyl; $R^{10}$ is loweralkyl, phenyl,

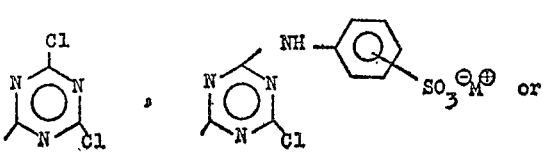

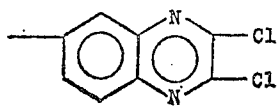

the $R^{11}$ groups are alike or different and are hydrogen, lower alkyl, halogen, hydroxy, —COOM or —SO₃M; and $M^{\oplus}$ is defined as above.

This invention is also directed to processes for producing compounds of this invention by the cyclization of hexacyanobutenediide to 1-amino-2,3,4,5,5-pentacyanocyclopentadiene which loses a cyano group in the presence of a nucleophilic agent to give aminotetracyanocyclopentadienide. Aminotetracyanocyclopentadienide is converted, inter alia, to diazotetracyanocyclopentadienide by nitrous acid. This in turn is converted (A) by a substitution reaction into pentacyanocyclopentadienide, tetracyanocyclopentadienide and halo-, i.e., chloro-, bromo-, and iodo-, mercapto-, nitro-, phenyl-, p-hydroxyphenyl-, carboxy-, azido-, and azotetracyanocyclopentadienide; (B) by a coupling reaction into unsubstituted and substituted hydroxyphenyl-, aminophenyl-, hydroxynaphthyl-, and aminonaphthylazotetracyanocyclopentadienide; and (C) by an addition reaction into triphenylphosphonium-, sulfonato-, and cyanoazotetracyanocyclopentadienide.

The compounds of this invention are useful as thrust-producing propellants for rockets and the azotetracyanocyclopentadienides formed by the coupling reaction are useful as dyes for nylon, cotton, other textiles, paper and leather.

DESCRIPTION OF THE PREFERRED EMBODIMENT

The compounds of this invention include 1-amino-2,3,4,5,5-pentacyanocyclopentadiene (Formula I); the 1-diazo-, 1-amino-, 1-trialkylphosphazino-, and 1-triarylphosphazino - 2,3,4,5 - tetracyanocyclopentadiene zwitterions (Formulas II, III, and IV); the highly acidic tetracyanocyclopentadiene and 1-substituted-2,3,4,5-tetracyanocyclopentadienes, and the tetracyanocyclopentadienide and 1-substituted-2,3,4,5-tetracyanocyclopentadienide salts (Formula V). The 1-substituents in these compounds include amino, cyano, hydroxy, carboxy, alkoxycarbonyl, azo (½), p-(N,N-dialkylamino)phenylazo, cyanoazo, halogen (i.e., fluoro, chloro, bromo, and iodo), alkyl, aryl, hydroxyphenyl, nitro, azido, mercapto, 2-hydroxy-α-naphthylazo and (anionic)sulfonatoazo.

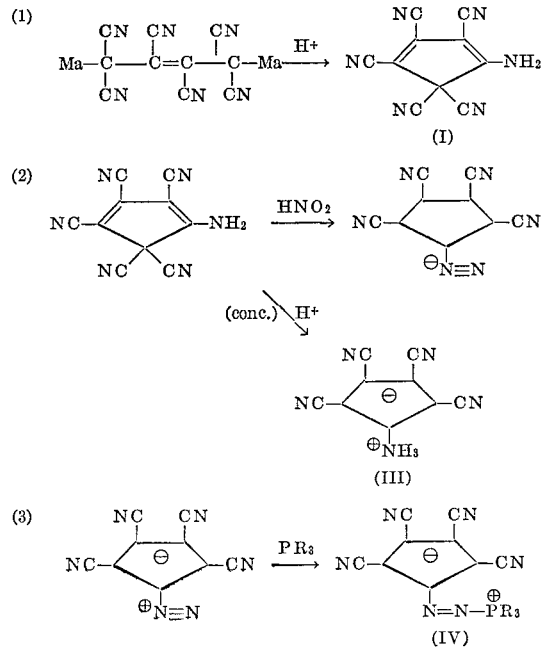

A preferred group of the products of this invention are indicated by Formula V:

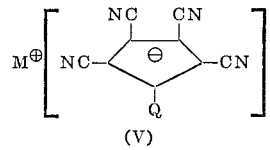

in which $M^{\oplus}$ can be thydrogen ion, one equivalent of a metal ion, an ammonium ion, or $C_{1-20}$ alkyl-substituted (preferably tetraalkyl-substituted) ammonium ion and Q may be hydrogen, amino, cyano, hydroxy, carboxy, alkoxycarbonyl, azo (i.e., ½ of —N=N—), p-(N,N-dialkylamino)phenylazo, cyanoazo, halogen (i.e., F, Cl, Br, or I), alkyl, or aryl, p-hydroxyphenyl, nitro, azido, mercapto, 2-hydroxy-α-naphthylazo and (anionic) sulfonatoazo.

The manner of preparing each of these classes of compounds is illustrated in the examples. A representative of the class where Q is azo is the product of Example XIII, which is illustrated by Formula VI.

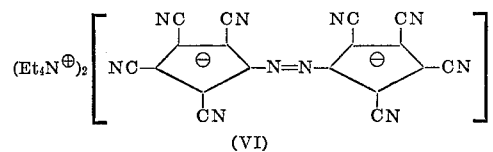

Another group of preferred compounds of Formula V which are useful as dyes include those wherein Q is —N=N—$R^1$ and $M^{\oplus}$ can be hydrogen ion, one equivalent of a metal ion, an ammonium ion, or a $C_{1-20}$ alkyl-substituted (preferably tetraalkyl-substituted) ammonium ion. The substituent $R^1$ is a group resulting from the removal of a hydrogen atom from a ring carbon in the para or ortho position of various phenols, anilines, naphthylamines, and naphthols, from the 4 position of 3-alkyl-5-pyrazolones and from other coupling components as defined below.

The compounds of this invention are prepared by treating a di(alkali metal) salt of 1,1,2,3,4,4-hexacyano-2-butenediide with acid to obtain 1 - amino - 2,3,4,5,5-pentacyanocyclopentadiene, treating the 1-amino-2,3,4,5,5-pentacyanocyclopentadiene with a concentrated aqueous mineral acid (i.e., any mineral acid with an acidity function approximating that of 12 N HCl) to obtain 1-amino-2,3,4,5-tetracyanocyclopentadiene or with nitrous acid at a pH below 1 to obtain 1 - diazo - 2,3,4,5-tetracyanocyclopentadiene, and treating the 1-diazo-2,3,4,5-tetracyanocyclopentadiene with trialkylphosphines or triarylphosphines to obtain, respectively, 1-trialkylphosphazino- and 1-triarylphosphazino-2,3,4,5 - tetracyanocyclopentadienes or with reducing agents to obtain tetracyanocyclopentadienide and 1 - substituted-2,3,4,5-tetracyanocyclopentadienide salts. The free acids, tetracyanocyclopentadiene and the 1-substituted-2,3,4,5-tetracyanocyclopentadienes, are prepared from their salts by treatment with an ion-exchange resin in acid form or by treatment of their silver salts with hydrochloric acid. Some of the preparations described above are indicated in Equations 1, 2, and 3 above and in Equation 4 which follows, in which $M_a$ is an alkali metal (preferably sodium or potassium) and R is lower (8 carbons or fewer) alkyl or aryl.

One method for preparing the compounds of Formula V is by the reaction

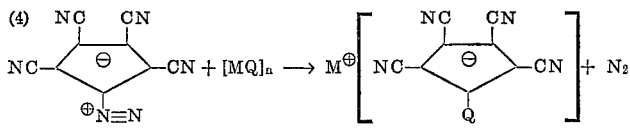

where M and Q are defined as above and $n$ is a positive integer from 1 to 6.

In an alternate procedure, it is sometimes desirable to hasten reaction (4) by using catalytic amounts of reducing agents such as copper metal, cuprous ion, cupric ion, zinc metal, or iodide ion. A catalyst is superfluous when the compound $[MQ]_n$ is a reducing agent, particularly a reducing agent having a polarographic half-wave potential below $+0.2$ volt measured in acetonitrile, referred to a standard calomel electrode.

By metal ion is meant the ionic form of any metallic element, i.e., an element having an atomic number of 3, 4, 11–13, 19–32, 37–51, 55–84, 87–102, and above. By alkyl is meant any aliphatically saturated hydrocarbon radical. By aryl is meant an aromatic hydrocarbon radical such as phenyl, biphenyl, naphthyl, anthryl, and the like. The alkyl and aryl groups suitably contain 20 carbon atoms or less and have as substituents only other alkyl and aryl groups. Those groups containing 9 carbon atoms or less (excluding substituents) are preferred.

The processes of this invention are carried out in the presence of water or an organic solvent which is inert to the reactants and products. Such solvents include the lower alcohols (i.e., methanol, ethanol, butanol, etc.), acetonitrile, benzonitrile, and the like. Temperatures of reaction can vary in the range from $-40°$ to $200°$ C. and above, a preferred range being from 0 to $100°$ C. Atmospheric pressure is preferred, but pressure is not a critical factor, and pressures both above and below atmospheric are operable.

Compounds of Formula V in which Q is alkyl are prepared as follows. Diazotetracyanocyclopentadiene is treated with a lithium alkyl such as lithium methyl. The resulting lithium methylazotetracyanocyclopentadienide is pyrolyzed to yield lithium 1-methyl-2,3,4,5-tetracyanocyclopentadienide. When lithium butyl is employed, lithium 1-butyl-2,3,4,5-tetracyanocyclopentadienide is obtained.

The diazotetracyanocyclopentadiene of this invention reacts like a typical aromatic diazonium salt as is shown by some of the reactions described hereinbefore. It will react with aromatic azo coupling components well known in the art to form preferred azo compounds which are useful as dyes. As is very well known in the art, coupling takes place with a coupling component such as a hydroxy, alkoxy or amino substituted benzene or naphthalene compound having an unsubstituted position either ortho or para to said substituent. The coupling components can contain substituents other than amino, alkoxyl or hydroxyl. Typical examples of such substituents are alkyl, cyano, trifluoromethyl, acyl such as acetyl or benzoyl, halogen, acylamido, sulfonylamido, sulfo, carboxyl, carbalkoxyl and the like, generally well-known substituents. It is possible for such coupling components to contain both alkoxyl and hydroxyl or hydroxyl and amino groups. Bulky substituents adjacent to the point of coupling are not desirable. When both hydroxyl and amino groups are present, the nature of the coupling product can often be changed by alteration of reaction conditions, as is indicated below.

In general, the azo coupling reactions of this invention can be carried out in either aqueous or organic solvent solutions. When organic solvents are used, they should be nonreactive with diazotetracyanocyclopentadiene. Thus, solvents which are readily oxidized, particularly primary or secondary alcohols, or solvents which react with the diazo compounds in other ways such as ketones or certain olefins, are undesirable. The preferred organic solvents are pyridine, nitriles such as acetonitrile or acids such as acetic acid.

In general, it is preferable to carry out azo couplings in aqueous media in which diazotetracyanocyclopentadiene can be dispersed. The aqueous media can be acidic, neutral or basic, depending primarily on the coupling component to be used. Thus, phenols or naphthols couple most readily in alkaline solution where the anion of the phenol or naphthol is present. The pH range of 7–9 is preferable, more highly alkaline solutions possibly having adverse effects on the diazo compound. On the other hand, anilines or naphthylamines couple more readily in slightly acidic solutions, pH 4–7, strongly acidic solutions causing reduced reaction rates. When the coupling component contains both hydroxyl and amine functions, the point of coupling is controlled by pH control. For example, 1-amino-8-naphthol couples at the 4 position, para to amino, under acid conditions and at the 5 position, para to hydroxyl, under basic conditions. Similar behavior is exhibited by other aminophenols and aminonaphthols. When sulfonic acid groups are present in the coupling component molecule, the position of coupling is usually changed, occurring adjacent to the hydroxyl group under alkaline conditions or adjacent to the amino group under acidic conditions. There are specific exceptions to these generalizations.

Some typically useful coupling components are phenols of the formula

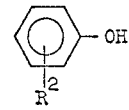

where $R^2$ is hydrogen, hydroxyl, alkyl, cyano, trifluoromethyl, acyl, amino, carboxyl or sulfo such as phenol, resorcinol, o-cresol, m-cresol, p-cresol, o-cyanophenol, o-trifluoromethylphenol, o-chlorophenol, m-chlorophenol, m-aminophenol, o - hydroxyacetophenone, o - hydroxybenzophenone, salicylic acid, phenol sulfonic acid, dimethylaminophenol and the like;

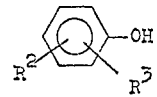

where $R^2$ and $R^3$ include alkyl, alkoxy, halogen and the like such as xylenol, dichlorophenol, 2,6-dimethoxyphenol and the like; anilines of the formula

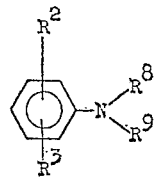

wherein $R^2$ and $R^3$ are hydrogen, lower alkyl, lower alkoxy, halogen, —NHCO-alkyl, —NHCO-phenyl or —NH—SO$_2$-p-tolyl and $R_8$ and $R_9$ are hydrogen, lower alkyl, hydroxylower alkyl, cyanolower alkyl or carbalkoxyalkyl such as aniline, dialkylanilines such as dimethylaniline or diethylaniline, N,N - bis - (2 - hydroxyethyl)aniline, N,N - bis(2' - cyanoethylaniline), N,N - bis(2' - carbalkoxyethyl)aniline, N-2' - hydroxyethyl - o -chloroaniline, N,N - dimethyl - N' - acetyl (or benzoyl)-m-phenylenediamine, N,N-bis(2' - hydroxyethyl)-N'-acetyl(or benzoyl)-m-phenylenediamine, N,N-bis(2'-carbalkoxyethyl)-N'-acetyl(or benzoyl)-m-phenylenediamine, N,N-bis(2' - acetoxyethyl) - N' - acetyl(or benzoyl)-m-phenylenediamine, N,N-bis(2'-acetoxyethyl)-N'-p-tolylsulfonyl - m - phenylenediamine, 2,5 - dimethylaniline, 2,5-dimethoxyaniline, 2-methoxy-5-methylaniline, 3-(N-benzoylamino) - 6 - methoxy - N - 2' - hydroxyethyl (or acetoxyethyl)-aniline; naphthols such as 1-naphthol, 2-naphthol, 4-acetyl-1-naphthol, 2-acetyl-1-naphthol, 3-hydroxy-2-naphthoic acid and its amides, 1-hydroxy-5-naphthoic acid, 3,5-dihydroxy-2,7-naphthalenedisulfonic acid, 1-naphthol-3,8-disulfonic acid, 1-naphthol-3-sulfonic acid, 4,5-dihydroxy-2,7-naphthalenedisulfonic acid, 1-naphthol-3,8-disulfonic acid, 2-naphthol-7-sulfonic acid, 2-chloro-1-naphthol; naphthylamines such as 1 - naphthylamine, 2-naphthylamine, N - 2' - hydroxyethyl-2-naphthylamine, N,N-bis(2'-hydroxyethyl)-2-naphthylamine, N,N-bis(2' - acetoxyethyl) - 2 - naphthylamine, 1 - anilinonaphthalene-8-sulfonic acid, 5 - aminonaphthalene-2-sulfonic acid, and 8-aminonaphthalene-2-sulfonic acid; aminonaphthols such as 8-amino-1-naphthol, 8-amino-2-naphthol, 5-amino-1-naphthol, 8-amino-1-naphthol-5,7-disulfonic acid, 7 - amino-1-naphthol-3-sulfonic acid, 8-amino-1-naphthol-3,6-disulfonic acid, 8-amino-1-naphthol-5-sulfonic acid and 7 - amino-1-naphthol-3,6-disulfonic acid. These, of course, are only representative examples.

Another group of useful coupling components are those containing a reactive group, giving the so-called fiber reactives. In these coupling components, an aromatic coupling component such as those indicated above is caused to react with a molecule such as

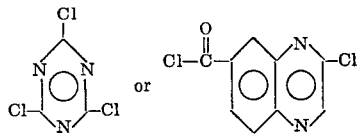

via a hydroxyl or amino group prior to coupling. Some typical useful examples are those prepared by reaction of the acid chloride group of

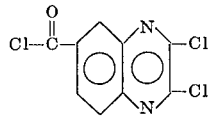

with the amino groups of any one of 6-amino-1-naphthol-3-sulfonic acid, 5-amino-1-naphthol - 3 - sulfonic acid, 7-amino-1-naphthol-3-sulfonic acid, 7-amino-1-naphthol-3,6-disulfonic acid, 8-amino-1-naphthol-5,7-disulfonic acid and 8-amino-1- naphthol-3,6-disulfonic acid.

Another group of useful coupling components, not based on members of the benzene or naphthalene series, are the 3-alkyl-5-pyrazolones. These compounds can be written as either

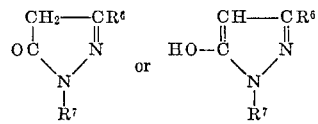

where $R^6$ is lower alkyl, preferably methyl or ethyl and including n-propyl, isopropyl, isobutyl, n-butyl, pentyl, hexyl, heptyl and octyl, and $R^7$ is hydrogen, lower alkyl, substituted alkyl, phenyl, naphthyl, substituted phenyl or substituted naphthyl. Typical examples of $R^7$ are methyl, ethyl, hydroxyethyl, phenyl, 3 - chlorophenyl, 3-sulfophenyl, 6-chloro-3-sulfophenyl, 4-sulfophenyl, 3,6-dichloro-4-sulfophenyl, 2-chloro-6-methyl-4-sulfophenyl, 2-chloro-4-sulfophenyl, 4-chloro-3-sulfophenyl, 4,8-disulfo-2-naphthyl, 6-sulfo-2-naphthyl, 2-hydroxy-3-carboxy-5-sulfophenyl and the like. These 3-alkyl-5-pyrazolones are coupled with diazotetracyanocyclopentadiene under basic conditions as described above. The pyrazolones are a well known group of compounds formed by the reaction of hydrazines with β-ketoesters.

There are certain other useful coupling components which do not fall into any of the above three categories. 4-hydroxycoumarin is an example of this group.

The coupling component in the preferred class of compounds which are useful as dyes is formed by the removal of a hydrogen atom from (1) the ortho or para position of aromatic hydroxy compounds such as phenol, phenols such as o-cresol and p-cresol, α-naphthol, α-naphthols, β-naphthol and β-naphthols; (2) the ortho or para position of aromatic amines such as aniline, anilines, α-naphthylamine, α-naphthylamines, β-naphthylamine and β-naphthylamines; (3) substituents containing a reactive methylene group such as the 3-alkyl-5-pyrazolones described above, 4-hydroxycoumarin, 4-hydroxycoumarins, acetoacetic esters such as methyl and ethyl acetoacetate, acetoacetanilide, acetoacetanilides, and 1,3-diketones such as 2,4-diketopentane. For typical coupling components see H. A. Lubs, The Chemistry of Synthetic Dyes and Pigments, Reinhold Publishing Corp., New York (1955).

The colors of the dyes obtained from diazotetracyanocyclopentadiene range completely across the visible spectrum. The colors observed range from yellows to blues. Because the structure of the dyes has a negative charge, they behave as so-called acid dyes. This behavior exists whether or not $R^1$ contains an acidic carboxyl or sulfonic acid group. These acid-type dyes are useful in a majority of the situations where acid dyes are used and in particular, they are useful for the dyeing of nylon.

In the examples which follow, parts are by weight unless otherwise indicated.

EXAMPLE I

Part A

A suspension of 1750 parts of sodium hydride mineral oil dispersion (56.5% NaH) in 23,600 parts of 1,2-dimethoxyethane is stirred at room temperature and a solution of 300 parts of 1,1,2,2-tetracyanoethane in 7000 parts of 1,2-dimethoxyethane is added gradually to the stirred suspension over a period of four hours. The temperature gradually rises to about 50° C., the mixture thickens and hydrogen is given off. The resulting mixture is stirred and heated for one hour at 75–84° C. during which time it turns from cream color to brilliant orange and a heavy oil separates. The mixture is allowed to stand at room temperature over night. The upper layer is decanted. To the heavy bottom layer is added 14,100 parts of acetonitrile. The mixture is stirred for 15 minutes and filtered to remove sodium cyanide. The filtrate is evaporated to dryness under water pump vacuum. The residue is taken up in 23,500 parts of acetonitrile, stirred and heated at reflux for 24 hours. The mixture is cooled to room temperature. The solid is collected by filtration, washed with two 2350 part portions of acetonitrile, then with two 3600 part portions of diethyl ether, and dried under reduced pressure to obtain 2300 parts of trans disodium 1,1,2,3,4,4-hexacyano-2-butenediide.

Part B

A solution of 50 parts of trans disodium 1,1,2,3,4,4-hexacyano-2-butenediide in 1000 parts of water is passed through a column of an ion-exchange resin in acid form (Amberlite IR–120). The resulting solution of 1,1,2,3,4,4-hexacyano-2-butene is substantially free of sodium ion (flame test) and is strongly acidic. At room temperature bright yellow crystals quickly form as a precipitate from this solution. This is separated by filtration and dried to obtain 12.4 parts of 1-amino-2,3,4,5,5-pentacyanocyclopentadiene in the form of yellow crystals which decompose at 215–230° C. without melting. The infrared absorption spectrum (mineral oil mull) is characterized by bands at 3100, 2210, 1670, 1600, 1560, and 1342 cm.$^{-1}$.

The ultraviolet absorption spectrum of an acetonitrile solution of this product shows a maximum at 413 millimicrons with a molecular extinction coefficient of 7000.

EXAMPLE II

A mixture of 150 parts of trans disodium 1,1,2,3,4,4-hexacyano-2-butenediide, 150 parts of water, 500 parts of an ion-exchange resin in acid form (Amberlite IR–120), and 3570 parts of diethyl ether is stirred for 0.5 hour. The ether layer is separated, dried over calcium chloride, and clarified by treatment with activated carbon. Evapoartion of the resulting solution gives 100 parts of 1-amino-2,3,4,5,5-pentacyanocyclopentadiene. This is purified by recrystallization from ether.

*Analysis.*—Calcd. for $C_{10}H_2N_6$ (percent): C, 58.3; H, 0.98; N, 40.8. Found (percent): C, 58.5; H, 1.13; N, 40.6.

EXAMPLE III

1 - amino - 2,3,4,5,5 - pentacyanocyclopentadiene (100 parts) is stirred with 2550 parts of concentrated hydroiodic acid (about 57%) at room temperature for about 15 minutes. The solid which forms is collected by filtration and dried to obtain 34 parts of aminotetracyanocyclopentadiene zwitterion. It is identified by its infrared absorption spectrum.

EXAMPLE IV

To 238 parts of concentrated hydrochloric acid at 0° C. is added 20 parts of 1-amino-2,3,4,5,5-pentacyanocyclopentadiene. The solution is allowed to warm to 20° C., and gas is evolved for about five minutes. The remaining mixture is then poured onto 200 parts of cracked ice. The precipitate which forms is collected by filtration and dried to obtain five parts of aminotetracyanocyclopentadiene zwitterion. It is purified by recrystallization from a mixture of acetonitrile and ethylene dichloride. The infrared absorption spectrum shows peaks at 3200 and 2600 cm.$^{-1}$, indicating a $NH_3^{\oplus}$ group. The ultraviolet absorption spectrum of an acetonitrile solution of this product shows peaks at 335, 293, and 240 millimicrons.

*Analysis.*—Calcd. for $C_9H_3N_5$ (percent): C, 59.7; H, 1.65; N, 38.7. Found (percent): C, 60.4; H, 2.20; N, 35.0.

EXAMPLE V

A solution of 100 parts of 1-amino-2,3,4,5,5-pentacyanocyclopentadiene in 7890 parts of methanol is heated at reflux for 16 hours. During this time the yellow color fades. Evaporation of the resulting solution yields 136 parts of ammonium aminotetracyanocyclopentadienide which is identified by its infrared and ultraviolet light absorption spectra.

*Analysis.*—Calcd. for $C_9H_6N_6$ (percent): C, 55.6; H, 3.03; N, 42.4. Found (percent): C, 55.4; H, 3.15; N, 41.9.

EXAMPLE VI

A mixture of 30 parts of 1-amino-2,3,4,5,5-pentacyanocyclopentadiene and 40 parts of potassium iodide in 1566 parts of acetonitrile is placed under a blanket of nitrogen and heated at reflux overnight. The reaction mixture is cooled to room temperature, filtered, and the filtrate is diluted with 7135 parts of diethyl ether. A cream-colored precipitate, weighing 25 parts, is separated by filtration. This solid is dissolved in 392 parts of acetonitrile and passed through a column of alumina (Woelm, acid activity 1). Potassium aminotetracyanocyclopentadienide (the first band to appear) is separated and recrystallized from acetonitrile.

$$UV\lambda_{max.}^{CH_3CN}$$

340 m$\mu$ ($\epsilon$=9600), 296 m$\mu$ ($\epsilon$=10,420), 262 m$\mu$ ($\epsilon$=15,760), and 237 m$\mu$ ($\epsilon$=39,000).

*Analysis.*—Calcd. for $C_9H_2N_5K$ (percent): C, 49.3; H, 0.91; N, 32.0. Found (percent): C, 49.6; H, 1.20; N, 31.2.

EXAMPLE VII

Concentrated hydrochloric acid (119 parts) is cooled to 5° C. and 20 parts of 1-amino-2,3,4,5,5-pentacyanocyclopentadiene is added. The mixture is allowed to warm slowly. At about 15° C. gas evolution occurs, and cooling is necessary to hold the temperature between 15° and 20° C. After the evolution of gas ceases, the solution is poured into 1,000 parts of ice water containing 200 parts of sodium bicarbonate. The resulting mixture is filtered and to the filtrate is added 40 parts of tetraethylammonium bromide. The precipitate which forms is separated by filtration and dried to yield 20 parts of tetraethylammonium aminotetracyanocyclopentadienide. It is purified by recrystallization from water. (The gas evolved as noted in this example is trapped in a solution of $Ba(OH)_2$ in water. Berium carbonate is isolated and identified by its infrared spectrum.)

*Analysis.*—Calcd. for $C_{17}H_{22}N_6$ (percent): C, 65.3; H, 7.25; N, 27.6. Found (percent): C, 65.5; H, 7.11; N, 27.4.

EXAMPLE VIII

A mixture of 100 parts of trans disodium 1,1,2,3,4,4-hexacyano-2-butenediide and 1190 parts of cold concentrated hydrochloric acid is allowed to warm slowly to 15° C. At this temperature gas evolution takes place for approximately ten minutes. The resulting solution is poured into ice water containing an excess of sodium bicarbonate. The neutralized solution is filtered, and to the filtrate is added 200 parts of tetraethylammonium bromide. The precipitate which forms is collected by filtration, dried, and recrystallized from water to obtain 35 parts of tetraethylammonium aminotetracyanocyclopentadienide. It is identified by its infrared spectrum.

EXAMPLE IX

A suspension of 608 parts of tetraethylammonium aminotetracyanocyclopentadienide in 20,000 parts of water and 1190 parts of concentrated hydrochloric acid is cooled to 0° C., and a solution of 60 parts of sodium nitrite in 1000 parts of water is added slowly during one-half hour. The reaction mixture is allowed to warm to room temperature during the next half hour. The insoluble portion is separated by filtration and treated with 1190 parts hydrochloric acid and 60 parts of sodium nitrite in 20,000 parts of water for two hours at room temperature. The remaining solid is collected by filtration and dried under reduced pressure to obtain 337 parts of diazotetracyanocyclopentadiene. It is purified first by recrystallization from ethylene dichloride and then from acetonitrile.

$$UV\lambda_{max.}^{CH_3CN}$$

331 m$\mu$ ($\epsilon$=14,950), 261.5 m$\mu$ ($\epsilon$=26,800), 252 m$\mu$ ($\epsilon$=29,400).

$$IR\lambda_{max.}^{Nujol}$$

4.44, 4.51, 6.60, 6.94, and 7.65$\mu$.

*Analysis.*—Calcd. for $C_9N_6$ (percent): C, 56.3; N, 43.8. Found (percent): C, 56.2; N, 43.2.

EXAMPLE X

To 238 parts of concentrated hydrochloric acid at 0° C. is added 20 parts of 1-amino-2,3,4,5,5-pentacyanocyclopentadiene. The mixture is stirred 45 minutes at 0–5° C. and is then diluted with 1000 parts of water. The diluted solution is treated with five parts of activated carbon and filtered. To the filtrate a solution of 15 parts of sodium nitrite in 50 parts of water is added portion-wise during a period of ten minutes. The solid which forms is collected by filtration and dried to obtain 15 parts of diazotetracyanocyclopentadiene.

EXAMPLE XI

To about 300 parts of concentrated hydrochloric acid at 0° C. is added 25 parts of transdisodium 1,1,2,3,4,4-hexacyano-2-butenediide. The solution is stirred for one-half hour and 15 parts of sodium nitrite in 15 parts of water is added slowly with stirring during the next 15 minutes. The solution is then diluted with 250 parts of water, and the insoluble portion is collected by filtration and dried to obtain 11 parts of crude diazotetracyanocyclopentadiene.

EXAMPLE XII

A suspension of 100 parts of cuprous cyanide in 3914 parts of acetonitrile is heated to reflux under a blanket of nitrogen. A solution of 95 parts of diazotetracyanocyclopentadiene in 1566 parts of acetonitrile is added slowly during the next 15 minutes. Nitrogen (about 11 parts) is evolved. After the gas evolution has ceased, the reaction mixture is filtered to remove a precipitate (A) and the filtrate is evaporated to dryness. The residue from the evaporation is dissolved in a solution of 200 parts of sodium cyanide in 20,000 parts of water. Two-hundred parts of tetraethylammonium chloride is added. The precipitate which forms (111 parts) is separated by filtration and recrystallized from water to obtain 30 parts of tetraethylammonium pentacyanocyclopentadienide, M.P. 357–362° C.

UV $\lambda_{max.}^{CH_3CN}$ 291 m$\mu$ ($\epsilon$=10,250), 281 m$\mu$ ($\epsilon$=10,850), 255 m$\mu$ ($\epsilon$=95,500), and 246 m$\mu$ ($\epsilon$=59,600).

IR $\lambda_{max.}^{KBr}$ 4.50 m$\mu$ (Et$_4$N$^+$ bands not given).

*Analysis.*—Calcd. for $C_{18}H_{20}N_6$ (percent): C, 67.47; H, 6.29; N, 26.23. Found (percent): C, 67.25; H, 6.21; N, 26.41.

EXAMPLE XIII (A) Precipitate A from Example XII is treated with a solution of 200 parts of sodium cyanide in 10,000 parts of water. The insoluble residue is separated by filtration and dissolved in 3914 parts of acetonitrile containing 200 parts of tetraethylammonium chloride. The resulting orange solution is chromatographed on acid-washed alumina. The first band to appear is collected and recrystallized from water to give 24 parts of tetraethylammonium azotetracyanocyclopentadienide.

UV $\lambda_{max.}^{CH_3CN}$ 484 m$\mu$ ($\epsilon$=21,800), 455 m$\mu$ ($\epsilon$=23,500), 428 m$\mu$ ($\epsilon$=23,400), 300 m$\mu$ ($\epsilon$=23,700), 282 m$\mu$ ($\epsilon$=53,300), 272 m$\mu$ ($\epsilon$=39,700), 256 m$\mu$ ($\epsilon$=24,600), 217 m$\mu$ ($\epsilon$=52,100).

IR $\lambda_{max.}^{KBr}$ 4.48$\mu$ (Et$_4$N$^+$ bands not given).

*Analysis.*—Calcd. for $C_{34}H_{40}N_{12}$ (percent): C, 66.2; H, 6.54; N, 27.3. Found (percent): C, 66.0; H, 6.38; N, 26.6.

(B) The tetraethylammonium azotetracyanocyclopentadienide of Part A is treated with a solution of AgNO$_3$ in acetonitrile to precipitate silver azotetracyanocyclopentadienide which is collected by suction filtration and air dried. This solid is shaken with a mixture of acetonitrile and aqueous potassium chloride to give an acetonitrile layer, which is a solution of potassium azotetracyanocyclopentadienide, and an aqueous layer. The acetonitrile layer is separated and the acetonitrile evaporated to yield potassium azotetracyanocyclopentadienide, a yellow salt.

Ten mg. of this yellow salt is dissolved in 100 ml. of water, and a dye test strip is heated in the solution for one hour on the steam bath. Cotton, wool silk, polyacrylonitrile, acrylonitrile/vinyl chloride copolymer and poly-(hexamethylene adipamide) test strips are dyed yellow-orange.

EXAMPLE XIV

A mixture of 282 parts of tetraethylammonium chloride, 100 parts of copper powder, and 3941 parts of acetonitrile is heated to reflux, and 202 parts of diazotetracyanocyclopentadiene in 2349 parts of acetonitrile is added portion-wise during the period of an hour. Nitrogen (about 28 parts) is evolved. The reaction mixture is then cooled, filtered, and the filtrate is concentrated by evaporation to about one-fourth its original volume. The concentrate is diluted with 10,000 parts of water. The precipitate which forms is collected by filtration and dried to obtain 299 parts of tetraethylammonium chlorotetracyanocyclopentadienide. It is recrystallized three times from ethylene chloride to obtain a product melting at 243–246° C.

*Analysis.*—Calcd. for $C_{17}H_{20}N_5Cl$ (percent): C, 61.9; H, 6.11; N, 21.2; Cl, 10.8. Found (percent): C, 61.5; H, 5.91; N, 21.3; Cl, 10.6.

EXAMPLE XV

A solution of 96 parts of diazotetracyanocyclopentadiene and 319 parts of tetraethylammonium bromide in 3914 parts of acetonitrile is heated at 50° C. During the course of one-half hour, about 13 parts of nitrogen is evolved. The remaining solution is concentrated by evaporation and diluted with water. The precipitate which forms is collected by filtration and dried to obtain 147 parts of tetraethylammonium bromotetracyanocyclopentadienide. It is recrystallized three times from ethylene chloride and once from water to obtain a product melting at 226–228° C.

*Analysis.*—Calcd. for $C_{17}H_{20}N_5Br$ (percent): C, 54.6; H, 5.39; N, 18.7. Found (percent): C, 54.8; H, 5.44; N, 19.1.

EXAMPLE XVI

To an acetonitrile solution of diazotetracyanocyclopentadiene is added an acetonitrile solution of sodium iodide. Nitrogen is given off. When gas evolution ceases, the reaction mixture is diluted with an aqueous solution of tetraethylammonium chloride. Tetraethylammonium iodotetracyanocyclopentadienide separates as a solid and is identified by its infrared absorption spectrum.

EXAMPLE XVII

A solution of 50 parts of sodium iodide in 548 parts of acetonitrile is stirred at room temperature, and a solution of 50 parts of diazotetracyanocyclopentadiene in 783 parts of acetonitrile is added portionwise during the period of a half hour. Nitrogen (about 7.6 parts) is evolved. The remaining solution is evaporated to dryness, and the residue dissolved in 1000 parts of water. The aqueous solution is treated with 50 parts of tetraethylammonium chloride. The precipitate which forms is collected by filtration and dried to obtain 91 parts of tetraethylammonium iodotetracyanocyclopentadienide. It is purified by recrystallization three times from ethylene dichloride and then once from water to obtain a product melting at 194.5–195.5° C.

UV$\lambda_{max.}^{CH_3CN}$ 300 m$\mu$ ($\epsilon$=10,100), 290 m$\mu$ ($\epsilon$=9,700), 250 m$\mu$ ($\epsilon$=40,400), 243 m$\mu$ ($\epsilon$=42,800).

*Analysis.*—Calcd. for $C_{17}H_{20}N_5I$ (percent): C, 48.5; H, 4.79; N, 16.6; I, 30.2. Found (percent): C, 48.7; H, 4.69; N, 16.5; I, 29.9.

EXAMPLE XVIII

A mixture of 96 parts of diazotetracyanocyclopentadiene and 50 parts of Cu$_2$(CN)$_2$ in 7928 parts of methanol is heated at reflux for one-half hour. The reaction mixture is cooled to room temperature, filtered, and the filtrate is evaporated to dryness. The resulting residue is treated with a solution of 200 parts of sodium cyanide and 200 parts of tetraethylammonium chloride in water. The precipitate which forms is separated by filtration, washed with water, and dried to obtain 111 parts of tetraethylammonium tetracyanocyclopentadienide. It is recrystallized from water to obtain a product melting at 129–130° C.

$UV\lambda_{max.}^{CH_3CN}$ 298 mμ (ε=14,500), 287 mμ (ε=13,500), 244 mμ (ε=56,800), 237 mμ (ε=42,400).

$IR\lambda_{max.}^{KBr}$ 4.55, 8.75, and 12.53μ ($Et_4N^+$ bands not given).

*Analysis.*—Calcd. for $C_{17}H_{21}N_5$ (percent): C, 69.1; H, 7.17; N, 23.7. Found (percent): C, 69.2; H, 7.26; N, 23.2.

EXAMPLE XIX

A suspension of 200 parts of copper powder, 20,000 parts of water, and 2200 parts of benzene is stirred at 50° C. and 384 parts of diazotetracyanocyclopentadiene is added. Nitrogen gas evolves as the diazo compound dissolves. After one hour 400 parts of $NaHCO_3$ is added and the reaction mixture stirred 15 minutes at room temperature. The copper and other solid products are separated by filtration and the water layer is collected and treated with 600 parts of tetramethylammonium bromide. The precipitate, which forms, is collected and dried. Tetramethylammonium phenyltetracyanocyclopentadienide, 85 parts, is extracted from the dried precipitate by hot ethylene chloride. The product is characterized by its infrared spectrum.

EXAMPLE XX (A) To a solution of 96 parts of diazotetracyanocyclopentadiene in 1566 parts of acetonitrile is slowly added 191 parts of N,N-dimethylaniline. The resulting orange solution is allowed to stand overnight. The solution is diluted with 14,270 parts of ether and the precipitate which forms is collected and dried. The precipitate is stirred one hour with 100 parts KOH in 5800 parts of water. The precipitate is then collected on a filter and dissolved in hot water. The hot water solution is treated with 100 parts of tetraethylammonium chloride. Tetraethylammonium p-(N,N-dimethylamino)phenylazotetracyanocyclopentadienide (95 parts) precipitates. The red-orange salt is recrystallized from ethylene chloride two times, M.P. 173–175° C.

*Analysis.*—Calcd. for $C_{25}H_{30}N_8$ (percent): C, 67.9; H, 6.83; N, 25.31. Found (percent): C, 68.0; H, 6.71; N, 25.5.

(B) Four grams of diazotetracyanocyclopentadiene in 50 ml. of acetonitrile is treated with 4 ml. of N,N-dimethylaniline. The reaction mixture is concentrated to dryness, and the residue is washed with ether. The insoluble product remaining is stirred with 4 g. of potassium hydroxide in 100 ml. of water. Potassium p-(N,N-dimethylamino)phenylazotetracyanocyclopentadienide (7.5 g.) remains insoluble and is collected on a filter and dried. Ten mg. of this orange solid is dissolved in 100 ml. of water and the resulting solution is heated on a steam bath with a cloth test strip made up of bands of different fibers: cotton, wool, viscose rayon, silk, cellulose triacetate, polyacrylonitrile, acrylonitrile/vinyl chloride copolymer, and poly(hexamethylene adipamide). All were dyed various shades of orange.

EXAMPLE XXI

A solution of 96 parts of diazotetracyanocyclopentadiene in 1566 parts of acetonitrile is treated with 141 parts of triphenylphosphine at room temperature. A red solution forms, and in a few minutes red crystals precipitate. Triphenylphosphazinotetracyanocyclopentadiene (210 parts is collected by filtration. The product is recrystallized from acetonitrile.

*Analysis.*—Calcd. for $C_{27}H_{15}N_6P$ (percent): C, 71.4; H, 3.33; N, 18.5. Found (percent): C, 71.5; H, 3.65; N, 18.2.

EXAMPLE XXII

To a stirred solution of 375 parts of silver pentacyanocyclopentadienide in 4697 parts of acetonitrile is added 160 parts of ferrous chloride. The system is blanketed with nitrogen and contains small traces of moisture. After 0.5 hour the white precipitate of silver chloride which forms is removed by filtration and the filtrate is concentrated by evaporation to about one-sixth its original volume. The reaction mixture is allowed to stand for 2 hours at room temperature and light green crystals of decacyanoferrocene slowly form. The ferrocene is collected by filtration under nitrogen, washed with acetonitrile and dried at 112° C. and 0.3 mm. pressure. Decacyanoferrocene does not melt or sublime on heating at 340° C. at 0.5 mm. pressure. (When an acetonitrile solution of decacyanoferrocene is exposed to the air, it quickly deposits a rust-colored solid.)

*Analysis.*—Calcd. for $C_{20}N_{10}Fe \cdot H_2O$ (percent): C, 52.9; H, 0.44; N, 30.9. Found (percent): C, 53.0; H, 0.57; N, 31.2.

$IR\lambda_{max.}^{Nujol}$ 3.00 and 6.1μ (water of hydration), 4.45μ (C≡N).

$UV\lambda_{max.}^{CH_3CN}$ 291 mμ (ε=20,800), 281 mμ (ε=20,900), 225 mμ (ε=198,000) and 246 mμ (ε=121,000).

EXAMPLE XXIII

A solution of tetraethylammonium tetracyanocyclopentadienide in acetonitrile is treated first with silver nitrate and then with water to obtain silver tetracyanocyclopentadienide. A solution of 273 parts of silver tetracyanocyclopentadienide in 3914 parts of acetonitrile is treated with 119 parts of concentrated hydrochloric acid. The silver chloride which precipitates is removed by filtration and the resulting strongly acidic solution is evaporated to dryness. There remains 145 parts of tetracyanocyclopentadiene which is identified by its infrared absorption spectrum.

EXAMPLE XXIV

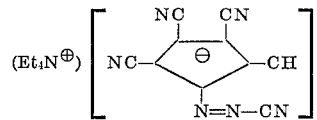

To a solution of 33 parts of dry potassium cyanide in 7928 parts of methanol is added 96 parts of diazotetracyanocyclopentadiene. The resulting deep yellow solution of potassium cyanoazotetracyanocyclopentadienide is poured into a solution of 500 parts of tetraethylammonium chloride in 20,000 parts of water. The precipitate which forms is collected by filtration and dried to obtain 93 parts of tetraethylammonium cyanoazotetracyanocyclopentadienide. It is purified by recrystallization from ethylene chloride.

$UV\lambda_{max.}^{CH_3CN}$ 405 mμ (ε=21,400), 276 mμ (ε=19,600), 254 mμ (ε=13,230).

$IR\lambda_{max.}^{KBr}$ 4.52, 4.60, 6.95, 7.55, 8.30, 9.75, 10.80μ ($Et_4N^\oplus$ absorption not given).

*Analysis.*—Calcd. for $C_{18}H_{20}N_8$ (percent): C, 62.1; H, 5.79; N, 32.2. Found (percent): C, 62.1; H, 5.50; N, 32.3.

(B) Ten mg. of tetraethylammonium cyanoazotetracyanocyclopentadienide is dissolved in 100 ml. of water. A cloth test strip is heated in this solution on a steam bath for one hour. Wool, silk, cellulose acetate, polyacrylonitrile and poly(hexamethylene adipamide) are dyed yellow-brown.

EXAMPLE XXV

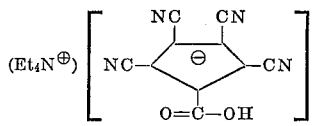

A mixture of 20 parts of diazotetracyanocyclopentadiene, 10 parts of copper powder, and 300 parts of water is placed in a stainless steel pressure vessel and pressured to 800 atmospheres with carbon monoxide. The reaction mixture is heated at 70° C. for one hour. It is then cooled to room temperature and excess CO is vented. The reaction mixture is filtered and 50 parts of tetraethylammonium chloride is added to the filtrate. A precipitate weighing 25 parts is collected by filtration. It is recrystallized once from ethylene chloride and twice from water to yield tetraethylammonium 1-carboxy - 2,3,4,5 - tetracyanocyclopentadienide in the form of cream-colored crystals melting at 273.5–275° C. The infrared absorption spectrum indicates a tetraethylammonium ion, cyano groups, and a carboxy group (bands at 2.81, 2.92, 3.82, 3.96, 6.00, and 7.80μ).

*Analysis.*—Calcd. for $C_{18}H_{21}N_5O_2$ (percent): C, 63.7; H, 6.24; N, 20.6. Found (percent): C, 64.0; H, 6.12; N, 20.7.

When 1-carboxy-2,3,4,5-tetracyanocyclopentadiene or one of its salts is treated with a diazoalkane, the corresponding alkoxycarbonyl compound is obtained. For example when tetraethylammonium 1-carboxy-2,3,4,5-tetracyanocyclopentadienide is treated with diazomethane, tetraethylammonium 1 - methoxycarbonyl - 2,3,4,5 - tetracyanocyclopentadienide is obtained.

EXAMPLE XXVI

To a mixture of 1000 parts of phenol 500 parts of zinc powder and 50,000 parts of water is added 1000 parts of diazotetracyanocyclopentadiene in small portions. After gas evolution ceases (approximately 1 hr.), the mixture is filtered and the filtrate is treated with 2000 parts of tetramethylammonium chloride. The gummy precipitate which forms is recrystallized from hot water. The resulting product is extracted with ethyl acetate and the ethyl acetate soluble portion is recrystallized from water. The resulting purified tetramethylammonium 1-(4-hydroxyphenyl) - 2,3,4,5 - tetracyanocyclopentadienide weighs about 50 parts and melts at 260–265° C. with decomposition. The above procedure is repeated and the crude product is purified by chromatography on alumina (Woelm, acid activity 1) with ethyl acetate and acetonitrile wash. The yield of tetramethylammonium 1-(4-hydroxyphenyl)-2,3,4,5-tetracyanocyclopentadienide is 225 parts.

*Analysis.*—Calcd. for $C_{19}H_{17}N_5O$ (percent): C, 68.9; H, 5.17; N, 21.1. Found (percent): C, 68.8; H, 5.05; N, 21.0.

IR $\lambda_{max.}^{KBr}$ 3.02, 4.53, 6.16, 6.53, 6.72, 6.82, 6.92, 7.00, 7.26, 7.87, 8.12, 8.42, 10.53 and 11.95μ

UV $\lambda_{max.}^{CH_3CN}$ 264 mμ ($\epsilon$=37,600).

EXAMPLE XXVII

A mixture of 40 parts of diazotetracyanocyclopentadiene, 28 parts of sodium nitrite, and 1000 parts of water is heated at 80° C. for 0.5 hour. Nitrogen is evolved and the salts dissolve. To the hot solution is added 50 parts of tetraethylammonium chloride and the precipitate which forms is collected by filtering the hot mixture. The precipitate (35 parts) of crude tetraethylammonium 1-nitro-2,3,4,5 - tetracyanocyclopentadienide is dried and chromatographed on alumina (Woelm, acid activity 1) with ethyl acetate/acetonitrile wash. The first band (15 parts, yellow) is collected and heated at 280° C./1 atm. for 3 hours in an open tube. The product, now light gray, is recrystallized from ethanol to give white tetraethylammonium 1-nitro - 2,3,4,5-tetracyanocyclopentadienide which melts at 370° C. with decomposition. This compound turns yellow in the presence of light.

*Analysis.*—Calcd. for $C_{17}H_{20}O_2N_6$ (percent): C, 60.0; H, 5.92; N, 24.7. Found (percent): C, 60.2; H, 6.37; N, 24.5.

IR $\lambda_{max.}^{KBr}$ 4.48, 6.54, 6.72, 7.46, 11.32, 13.18 and 13.50μ.

UV $\lambda_{max.}^{CH_3CN}$ 349 mμ ($\epsilon$=3650), 273 mμ ($\epsilon$=31,200), 265 mμ ($\epsilon$=29,050), and 211 mμ ($\epsilon$=25,250).

When tetraethylammonium 1-nitro-2,3,4,5-tetracyanocyclopentadienide is refluxed with zinc and hydrochloric acid, tetraethylammonium 1-amino-2,3,4,5-tetracyanocyclopentadienide is formed. This product is characterized by its infrared spectrum.

EXAMPLE XXVIII

To a solution of 65 parts of sodium azide in 2000 parts of water is slowly added 196 parts of diazotetracyanocyclopentadiene. Gas evolves slowly at room temperature. After 0.5 hour, 200 parts of tetraethylammonium chloride is added and 300 parts of white tetraethylammonium 1-azido-2,3,4,5-tetracyanocylclopentadienide is collected by filtration and dried. The product turns light orange after drying overnight in air. The product is recrystallized from ethanol to obtain 150 parts of the purified compound which melts at 120–125° C. with decomposition.

*Analysis.*—Calcd. for $C_{17}H_{20}N_8$ (percent): C, 60.7; H, 5.99; N, 33.3. Found (percent): C, 61.6; H, 6.11, N, 33.4.

IR $\lambda_{max.}^{Nujol}$ 4.52, 4.60, 4.75, 7.88, and 11.18μ. ($Et_4N^+$ bands not given).

UV $\lambda_{max.}^{CH_3CN}$ 300 mμ ($\epsilon$=9560), 270 mμ ($\epsilon$=34,500), and 275 mμ ($\epsilon$=39,400).

EXAMPLE XXIX

A solution of 200 parts of diazotetracyanocyclopentadiene and 165 parts of ethyl potassium xanthate in 7828 parts of acetonitrile is slowly heated to reflux. Nitrogen evolution becomes vigorous at about 50° C. The reaction mixture is heated under reflux for 0.5 hour and then cooled and evaporated to dryness. The residue is dissolved in a warm solution of 2000 parts of potassium hydroxide in 15,000 parts of water and is allowed to stand for 0.5 hour. The basic solution is then acidified with dilute hydrochloric acid (precautions being taken to absorb the fumes in aqueous potassium hydroxide). The acid solution is treated with 1000 parts of tetraethylammonium chloride and the crude tetraethylammonium 1-mercapto-2,3,4,5-tetracyanocyclopentadienide which precipitates (225 parts) is collected and dried. After two recrystallizations from ethanol, the purified product weighs 170 parts and melts at 275–280° C. with decomposition.

*Analysis.*—Calcd. for $C_{17}H_{21}N_5S$ (percent): C, 62.3; H, 6.41; N, 21.4; S, 9.80. Found (percent): C, 61.9; H, 6.04; N, 21.7; S, 10.0.

IR $\lambda_{max.}^{KBr}$ 3.70 and 4.52μ ($Et_4N^+$ bands not given).

UV $\lambda_{max.}^{CH_3CN}$ 340 mμ (ε=4000), 271 mμ (ε=22,200), and 233 mμ (ε=22,700).

EXAMPLE XXX

To a mixture of 144 parts of β-naphthol and 100 parts of potassium acetate in 3914 parts of acetonitrile is added 196 parts of diazotetracyanocyclopentadiene in one portion at room temperature. The solution turns bright orange in color and is stirred at room temperature overnight. During this time, orange-colored potassium 1-(2-hydroxy-α-naphthylazo) - 2,3,4,5-tetracyanocyclopentadienide (212 parts) crystallizes out and is collected by filtration. This product is dissolved in water/acetonitrile. A solution of 400 parts of tetraethylammonium chloride in 10,000 parts of water is added and the orange precipitate which forms is collected by filtration and dried (350 parts). It is recrystallized from ethanol to yield tetraethylammonium 1(2-hydroxy-α-naphthylazo) - 2,3,4,5 - tetracyanocyclopentadienide melting at 208–213° C.

*Analysis.*—Calcd. for $C_{27}H_{27}N_7O$ (percent): C, 69.5; H, 5.85; N, 22.0. Found (percent): C, 69.7; H, 5.93; N, 22.0.

EXAMPLE XXXI

Powdered diazotetracyanocyclopentadiene (196 parts) is added in one portion to a solution of 214 parts of $NaHSO_3$ in 5000 parts of water at room temperature. The resulting yellow solution is stirred 0.5 hour and then filtered into a solution of 500 parts of tetraethylammonium chloride in 1000 parts of water. Light yellow di(tetraethylammonium) 1-sulfonatoazo-2,3,4,5-tetracyanocyclopentadienide (300 parts) crystallizes out and is collected by filtration. After recrystallization three times from water, the purified product melts at 214–217° C. with decomposition.

*Analysis.*—Calcd. for $C_{25}H_{40}N_8O_3S$ (percent): C. 56.4; H, 7.54; N, 21.1; S, 6.02. Found (percent): C, 56.3; H, 7.54; N, 20.9; S, 600.

IR $\lambda_{max.}^{Nujol}$ 4.54; 7.95, 8.10, 9.64, 10.05, 10.66, 12.28, 12.70, and 13.59μ.

UV $\lambda_{max.}^{CH_3CN}$ 436 mμ (ε=247), 342 mμ (ε=10,570), 279 mμ (ε=34,300), 271 mμ (ε=32,300), and 210 mμ (ε=9060).

When an aqueous solution of di(tetraethylammonium) 1 - sulfonatoazo - 2,3,4,5 - tetracyancyclopentadienide is treated with aqueous silver nitrate, disilver 1-sulfonatoazo-2,3,4,5-tetracyanocyclopentadienide is formed and is largely precipitated from solution. When disilver 1-sulfonatoazo-2,3,4,5-tetracyanocyclopentadienide is treated in dilute aqueous solution with molecular equivalents of metal chlorides such as sodium chloride, potassium chloride, barium chloride, calcium chloride and ferric chloride, silver chloride is precipitated. Evaporation of the remaining solution yields the corresponding sodium potassium, barium, calcium, and ferric 1-sulfonatoazo-2,3,4,5-tetracyanocyclopentadienide salts. By metathesis reactions of this type, any anionic 1-sulfonatoazo-2,3,4,5-tetracyanocyclopentadienide may be prepared.

EXAMPLE XXXII

An intimate mixture of 0.5 g. diazotetracyanocyclopentadiene and 0.5 g. $KClO_4$ is packed into a copper tube approximately 5 mm. in diameter x 10 cm., closed at one end. The tube is suspended by a cord and the open end is ignited by a flame. The rocket is impelled in a circular path as the fuel burns.

EXAMPLE XXXIII

The procedure of Example XXXII is repeated using 0.5 g. of tetraethylammonium tetracyanocyclopentadienide and 0.5 g. $KClO_4$. The rocket is impelled in a circular path as the fuel burns.

All of the products of this invention are useful as thrust-producing propellants. Thus, when 1-amino-2,3,4,5,5 - pentacyanocyclopentadiene, 1-amino-2,3,4,5,5-pentacyanocyclopentadiene zwitterion, 1-(triphenylphosphazino) - 2,3,4,5-tetracyanocyclopentadiene zwitterion, 1,2,3,4,5-pentacyanocyclopentadiene, decacyanoferrocene, or tetraethylammonium 1-chloro-2,3,4,5-tetracyanocyclopenadienide is substituted for 1-diazo-2,3,4,5-tetracyanocyclopentadiene in the procedure of Example XXXII rocket propulsion is obtained.

The cyanocyclopentadiene compounds of this invention contain at least four cyano substituents on ring carbon atoms. Salts of these tetra- and pentacyanocyclopentadiene compounds have the surprising characteristic of being chemically stable to handling in air. This is in sharp contrast to cyclopentadiene compounds without these substituents. For example, sodium cyclopentadienide must be carefully protected from air or oxygen to prevent decomposition.

Compounds of Formula V where M is hydrogen are readily obtained by adding concentrated hydrochloric acid to an acetonitrile solution of one of the corresponding silver salts as illustrated in Example XXIII. The free acid is obtained as an acetonitrile solution from which it is recovered by evaporation.

When aqueous solutions of these acids react with metal oxides or hydroxides or ammonium or sulfonium hydroxides, the corresponding salts are obtained. Those salts which are insoluble in water precipitate, and are recovered by filtration. The soluble salts are recovered by evaporation. Thus, when one of the 1-substituted-2,3,4,5-tetracyanocyclopentadienes, for example, 1,2,3,4,5-pentacyanocyclopentadiene, reacts in an aqueous solution with an oxide or hydroxide of $Li^+$, $Na^+$, $Mg^{++}$ $Al^{+++}$, $K^+$, $Ca^{++}$, $Ti^{++++}$, $Cr^{+++}$, $Mn^{++}$,, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{+++}$, $Ag^+$, $Cd^{++}$, $Sn^{++}$, $Cs^+$, $Ba^{++}$, $Hg^{++}$, $Pb^{++}$, or $Bi^{+++}$, the corresponding 1,2,3,4,5-pentacyanocyclopentadienide salts are formed. The corresponding ammonium tetramethyl ammonium, and trimethylsulfonium salts are similarly prepared.

In a like manner, tetracyanocyclopentadiene, prepared as in Example XXIII, is dissolved in water and is reacted with the oxides or hydroxides of the metals noted above to form the corresponding metal, ammonium tetraalkylammonium, and trialkylsulfonium 1,2,3,4-tetracyanocyclopentadienide salts.

Other salts of this invention are similarly obtained. Tetraethylammonium pentacyanocyclopentadienide of Example XII, bis(tetraethylammonium) 1,1' - azobis-(2,3,4,5-tetracyanocyclopentadienide) of Example XIII, tetraethylammonium 1 - chloro-2,3,4,5-tetracyanocyclopentadienide of Example XIV, tetraethylammonium. 1-bromo-2,3,4,5-tetracyanocyclopentadienide of Example XV, and tetraethylammonium 1-iodo-2,3,4,5-tetracyanocyclopentadienide of Example XVII are converted to their silver salts with silver nitrate in acetonitrile and the silver salts are treated with hydrochloric acid to obtain, respectively, 1,2,3,4,5 - pentacyanocyclopentadiene, 1,1'-azobis(2,3,4,5 - tetracyanocyclopentadiene), 1 - chloro-2,3,4,5 - tetracyanocyclopentadiene, 1 - bromo - 2,3,4,5-tetracyanocyclopentadiene, and 1-iodo-2,3,4,5-tetracyanocyclopentadiene. These acids are reacted in turn with the oxides and hydroxides noted above to obtain the corresponding metal, ammonium, tetraalkylammonium, and trialkylsulfonium salts.

As indicated in Examples V, VI, and VII, salts of 1-amino-2,3,4,5-tetracyanocyclopentadiene can be prepared directly from 1-amino-2,3,4,5,5-pentacyanocyclopentadiene by the action of alcohols, alkali metal iodides, or concentrated hydrogen halide acids, followed by neutralization. These salts in turn may be treated with nitrous acid to obtain 1-diazo-2,3,4,5-tetracyanocyclopentadiene as shown in Example IX.

Part A of Example I shows the preparation of disodium 1,1,2,3,4,4-hexacyano-2-butenediide by heating the disodium salt of 1,1,2,2,-tetracyanoethane. Other alkali metal and alkaline earth metal 1,1,2,3,4,4,-hexacyano-2-butenediide starting materials are similarly prepared by heating the corresponding alkali and alkaline earth metal salts of tetracyanoethane. Metal salts of 1,1,2,2-tetracyanoethane are shown in U.S. Pat. 2,788,356.

The compounds of this invention wherein Q is —N=N—$R^1$ are useful as dyes. The production of these compounds is described in Examples XXXIV and XXXV and the use of these compounds as dyes is described in Tables I and II.

EXAMPLE XXXIV

A mixture of 100 parts of phenol and 136 parts of sodium acetate (used to buffer solution) in 5000 parts of water is adjusted to a pH of 9–11 with dilute aqueous sodium hydroxide. To the resulting basic mixture at room temperature 192 parts of powdered diazotetracyanocyclopentadiene is added slowly with stirring. As the coupling reaction proceeds the pH of the mixture decreases; the pH is maintained between 9–11 by intermittent addition of dilute aqueous sodium hydroxide. After complete addition of the diazo compound the coupling reaction is considered complete when the pH has become stable between 9–11. The reaction is then allowed to continue stirring for an additional 30 minutes to one hour. Then the pH is adjusted to 7–8.5 by addition of hydrochloric acid solution and the mixture is salted to approximately 10% by weight with 500 parts of sodium chloride. After complete precipitation the mixture is filtered and the cake is washed with 10% salt solution. The final washed cake is dried, giving 327 parts of crude sodium p-hydroxyphenylazo-tetracyanocyclopentadienide as a yellow-orange powder.

*Analysis.*—Calcd for $C_{15}H_5N_6ONa$ (percent): N, (azo), 9.1. Found (percent): N, (azo), 6.3, 6.2.

Visible spectrum in $H_2O$: $\gamma$ max 400 m$\mu$.

The procedure of Example XXXIV is operative with phenols and naphthols of the formula

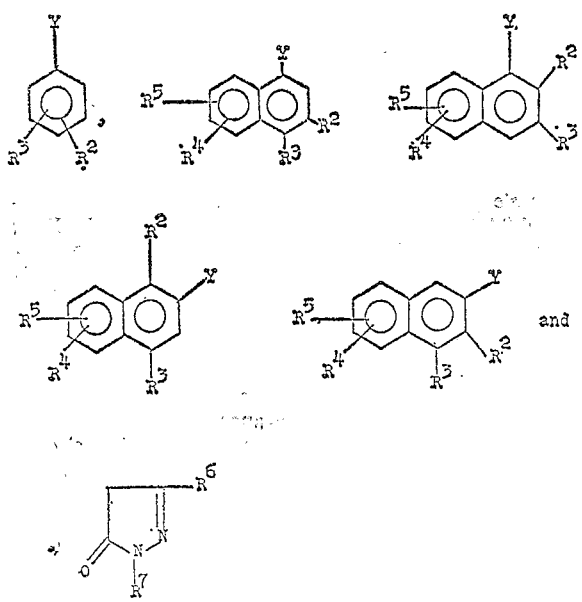

where Y is —OH or lower alkoxy where the akoxy portion contains up to 8 carbon atoms and $R^2$, $R^3$, $R^4$, $R^5$, $R^6$ and $R^7$ are as defined above.

The following dyes listed in Table I were prepared by the same general procedure as that described above. Nylon used in Table I was poly(hexamethylene adipamide). The dyeing procedure for dyeing nylon in Table I is as follows:

A nylon (polyhexamethylene adipamide) skein, 5 parts, is immersed in 200 parts of water containing 0.05– 0.01% of crude dye, 0.75–1.0 p-dodecyldiphenyl ether disulfonic acid, disodium salt (U.S. 2,081,876), 0.5–1.0% of a nonionic surfactant (the condensation product of 10 moles of ethylene oxide with one mole of $C_{18}$ alcohol). Percentages are based on the weight of the skein. The pH is adjusted to 6.5 or 7.5 with monosodium phosphate and/or tetrasodium pyrophosphate and the dyebath heated to 98°–100° C. for 1 hour. The skein is rinsed in cold water and finally dried.

The fiber reactive dyes shown in Table I were applied to cotton from water at about 1% dye concentration level in the presence of about 10 g./liter of sodium chloride followed by increasing the pH to above 8.

The dyes of this invention, i.e., where Q is —N=N—$R^1$ are useful as dyes for nylons, cotton, other textiles, paper and leather.

TABLE I

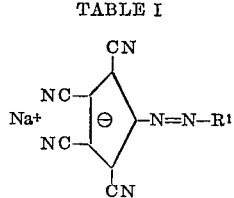

| $R^1$ | Color (on nylon) | $\lambda_{max}$ m$\mu$ ($H_2O$) |
|---|---|---|
| —⟨◯⟩—OH | Yellow | 400 |
| —⟨◯(CH₃)⟩—OH | do | 395 |
| —⟨◯(CN)⟩—OH | do | 400 |
| —⟨◯(CF₃)⟩—OH | do | 393 |
| —⟨◯(Cl)⟩—OH | do | 390 |
| —⟨◯(O=C—CH₃)⟩—OH | Tan | ¹400 |
| —⟨◯(CH₃)⟩ HO | Yellow | 413 |

| R¹ | Color (on nylon) | λmax mμ (H₂O) | R¹ | Color (on nylon) | λmax mμ (H₂O) |
|---|---|---|---|---|---|
| 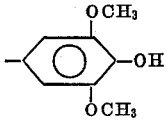 | ...do... | 415 | 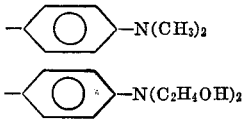 | Orange | 492 |
| | | | 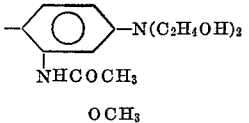 | ...do... | 497 |
| 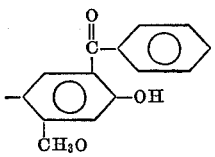 | Yellow-tan | ¹410 | 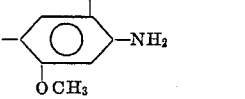 | Coral | 480 |
| 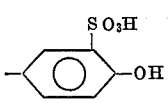 | | |  | Orange | 500 |
| 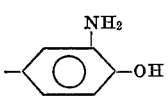 | | |  | ...do... | 470 |
| 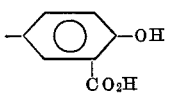 | | | 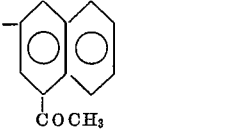 | Red-brown | |
| 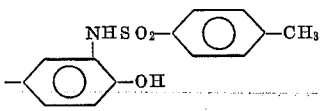 | | | | | |
| 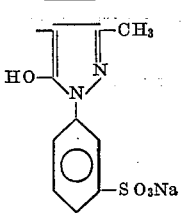 | Yellow | 440 | 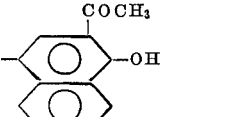 | Orange-brown | ¹360, 490 |
| | | | 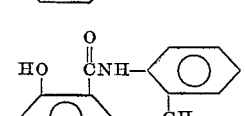 | Red-violet | 507 |
| 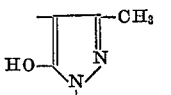 | ...do... | 455 | | | |
| | | | 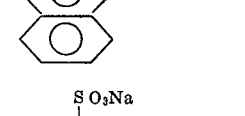 | Red-violet | 530 |
| 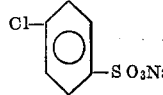 | Yellow orange | | 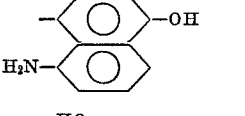 | Violet | 500 |
| | | | 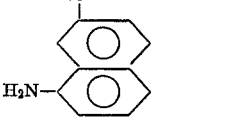 | Gray-blue | 535 |
| 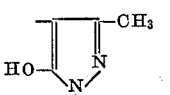 | ...do... | 452 | 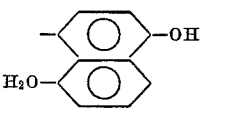 | Gray-blue | |
| 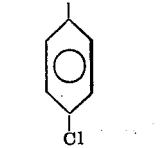 | ...do... | 465 | 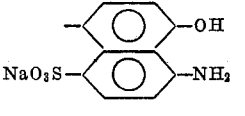 | Violet | |

| $R^1$ | Color (on nylon) | $\lambda_{max}\,m\mu$ ($H_2O$) |
|---|---|---|
| ![structure with OH, SO3Na, SO3Na] | Tan | |

In the following six compounds, the test strip was cotton and B is

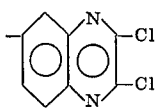

[1] Shoulder.

TABLE I.—Continued

| $R^1$ | Color |
|---|---|
| ![structure SO3Na, OH, NH-CO-B] | Red. |
| ![structure SO3Na, OH, HN-COB] | Do. |
| ![structure SO3Na, OH, NH-COB] | Do. |
| ![structure SO3Na, OH, NHCOB, SO3Na] | Do. |
| ![structure OH, NaO3S, NHCOB, SO3Na] | Violet. |
| ![structure SO3Na, OH, NHCOB, SO3Na] | Do. |

EXAMPLE XXXV

A mixture of 209 part of N,N-bis(2-cyanoethyl)-aniline and 136 parts of sodium acetate in 5000 parts of water is adjusted to a pH of 3–6 with either dilute hydrochloric acid solution or glacial acetic acid. To the resulting acidic mixture at room temperature, 192 parts of powdered diazotetracyanocyclopentadiene is added slowly with stirring. As the coupling reaction proceeds, the pH of the mixture decreases; however, the pH is maintained between 3–6 by intermittent addition of dilute aqueous sodium hydroxide. Once the pH has appeared to stabilize, the mixture is allowed to continue to stir for an additional 12–24 hours. Then the mixture is filtered and the cake washed with 10% salt solution. The final washed cake is dried in a vacuum oven at 80° C., is giving 371 parts of crude hydroninum p-[N,N-bis-(2-cyanoethyl)amino]benzeneazotetra - cyanocyclopentadienide as an orange powder.

Vis. spec.: ($H_2O$): λ max 469 mµ

Dyes listed in Table II were prepared by the same general procedure as that described above. The dyeing procedure used to prepare dyed nylon skeins is the same as described above in Table I. The λ max of the dyes listed in Table II was determined in aqueous solution.

TABLE II

![tetracyanocyclopentadienide structure with —N=N—R1, H+]

| $R^1$ | Color | $\lambda\,max.\,m\mu$ |
|---|---|---|
| ![phenyl-N(CH2CH2CN)2] | Yellow-orange | 469 |
| ![phenyl with OCH3, NHC2H4OH, NHCO-phenyl] | Red | 490 |
| ![naphthyl-H2N] | do | 491 |
| ![phenyl with NHC2H4OH] | do | |
| ![chromone structure OH, O=, O] | Orange-red | 469 |
| ![naphthyl H2N, SO3H] | Red | 491 |
| ![phenyl-NH-phenyl, SO3H, SO3H] | Red-violet | 526 |

| $R^1$ | Color | $\lambda_{max}, m\mu$ |
|---|---|---|
| 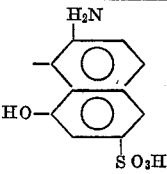 | ----do---- | 520 |
|  | Violet | 541 |
| 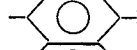 | Gray-blue | 545 |
|  | Red | |

The foregoing detailed description has been given for clarity of understanding only and no unnecessary limitations are to be understood therefrom. The invention is not limited to the exact details shown and described for obvious modifications will be apparent to those skilled in the art.

I claim:

The embodiments of the invention in which an exclusive property or privilege is claimed are defined as follows:

1. A cyanocyclopentadiene compound in which at least four ring carbon atoms carry cyano substituents, of the formula

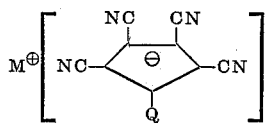

wherein $M^\oplus$ represents one equivalent of an ion selected from the class consisting of hydrogen ion, metal ion, ammonium ion and $C_{1-8}$ alkyl-substituted ammonium ion and Q is selected from the class consisting of azobis, cyanoazo, (anionic) sulfonatoazo and $-N=N-R^1$ where $R^1$ is a group selected from the class consisting of

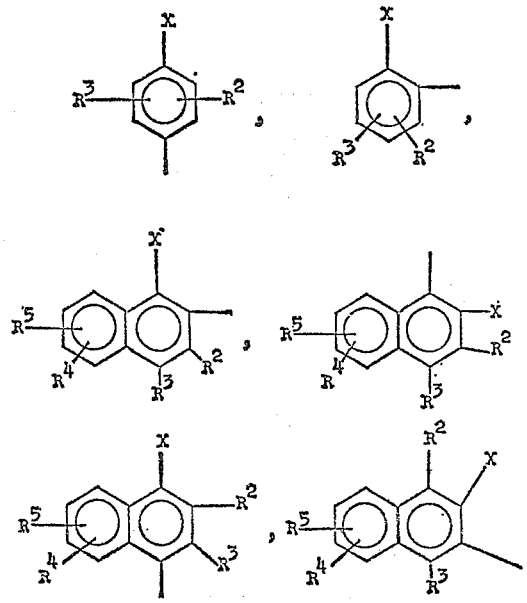

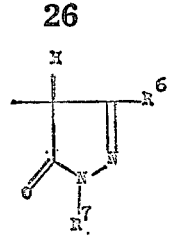

where X is hydroxy, lower alkoxy or $-NR^8R^9$; $R^2$, $R^3$, $R^4$ and $R^5$ are hydrogen, lower alkyl, $-CN$, halogen, hydroxy, $-COOM$,

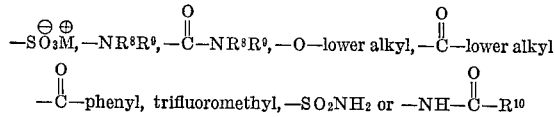

$R^6$ is lower alkyl; $R^7$ is hydrogen, lower alkyl, hydroxylower alkyl,

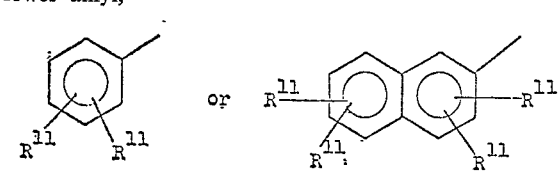

$R^8$ and $R^9$ are hydrogen, lower alkyl, hydroxylower alkyl, cylanolower alkyl or phenyl; $R^{10}$ is lower alkyl, phenyl,

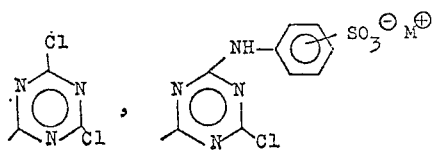

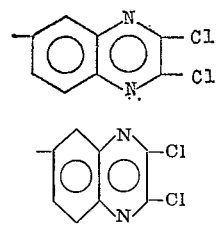

the $R^{11}$ groups are alike or different and are hydrogen, lower alkyl, halogen, hydroxy, $-COOM$ or $-SO_3M$; and $M^\oplus$ is defined as above.

2. A compound of formula

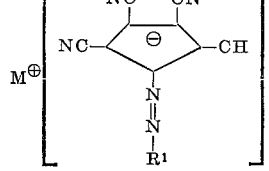

wherein $M^\oplus$ and $R^1$ are as defined in claim 1.

3. The compound of the formula

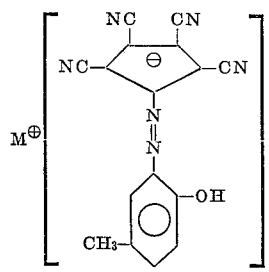

wherein $M^\oplus$ is as defined in claim 1.

4. A cyanocyclopentadiene compound in which at least four ring carbon atoms carry cyano substituents, of the formula

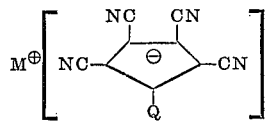

wherein M⊕ represents one equivalent of an ion selected from the class consisting of hydrogen ion, metal ion, ammonium ion, and $C_{1-8}$ alkyl-substituted ammonium ion and Q is selected from the class consisting of azobis, p-(N,N-dialkylamino)phenylazo wherein each alkyl group thereof contains up to and including 8 carbon atoms, cyanoazo, 2-hydroxy-1-naphthylazo, and (anionic)sulfonatoazo.

5. A cyanocyclopentadiene compound of Claim 4 wherein M⊕ represents $C_1-C_8$ alkyl-substituted ammonium ion and Q is selected from the class consisting of azobis, p-(N,N-dialkylamino)phenylazo wherein each alkyl thereof contains up to and including 8 carbon atoms, cyanoazo, 2-hydroxy-1-naphthylazo, and (anionic)sulfonatoazo.

6. A compound of claim 4 of the formula

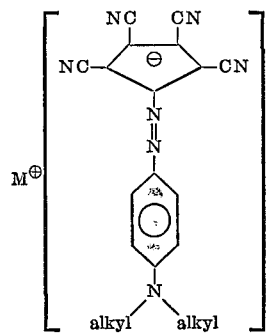

where M⊕ and alkyl are as defined in claim 4.

7. The compound of claim 6 wherein said compound is tetraethylammonium p-(N,N-dimethylamino)phenylazotetracyanocyclopentadiene.

8. A compound of claim 4 of the formula

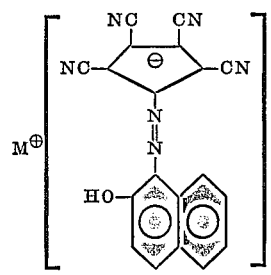

where M⊕ is as defined in claim 4.

9. The compound of claim 8 wherein said compound is tetraethylammonium 1-(2-hydroxy-1-naphthlazo)-2,3,4,5-tetracyanocyclopentadienide.

10. Process which comprises reacting diazotetracyanocyclopentadiene at about −40° C.−200° C. in the presence of water or an inert organic solvent with a compound MQ′, wherein M is selected from the group consisting of hydrogen and one equivalent of metal ion and, when M is hydrogen Q′ is selected from the group consisting of p-(N,N-dialkylamino)phenyl wherein each alkyl thereof contains up to and including 8 carbon atoms, p-hydroxyphenyl and 2-hydroxy-1-naphthyl, and when M is one equivalent of metal ion Q′ is cyano and bisulfite, to yield the corresponding compound of the formula

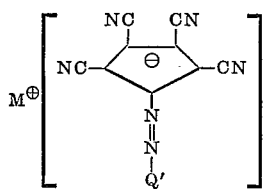

wherein M and Q′ are defined as above.

11. A process for preparing compounds of claim 1 of the formula

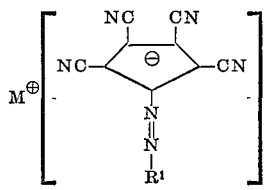

wherein M⊕ and R¹ are as defined in claim 1, which comprises contacting, in the presence of M⊕ and a base and water or an inert organic solvent at a temperature of 0° to 50° C., diazotetracyanocyclopentadiene with a coupling component selected from the class consisting of

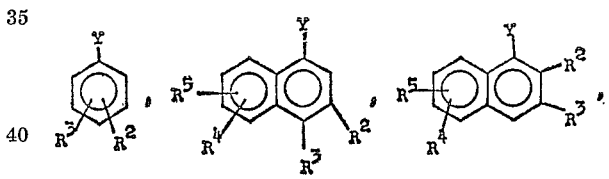

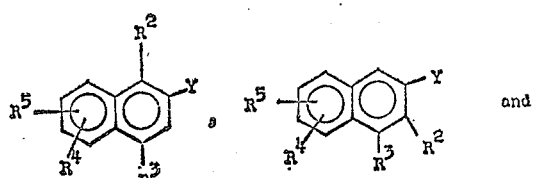

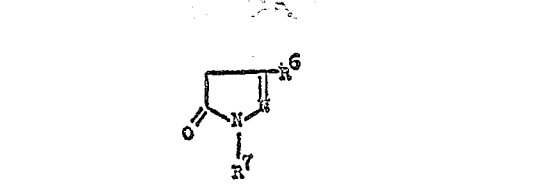

where R², R³, R⁴, R⁵, R⁶ and R⁷ are as defined in claim 1 and Y is hydroxy or lower alkoxy.

12. A process for preparing compounds of claim 1 of the formula

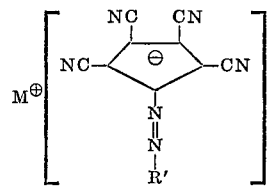

wherein M⊕ and R¹ are as defined in claim 1 which comprises contacting in the presence of M⊕ and an acid and water or an inert organic solvent at a temperature of 0° to 50° C., diazotetracyanocyclopentadiene with a coupling component selected from the group consisting of

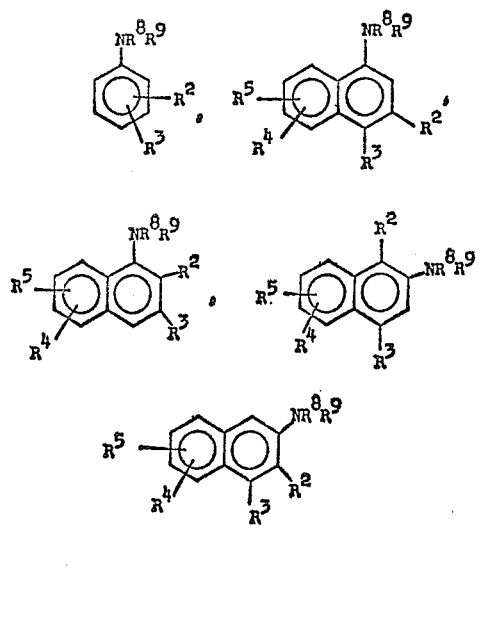

where $R^2$, $R^3$, $R^4$, $R^5$, $R^8$ and $R^9$ are as defined in claim 33.

13. The process of claim 10 wherein the compound

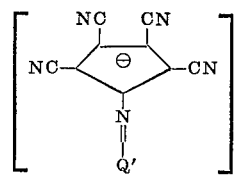

is contacted with a soluble ammonium or $C_1$–$C_8$ alkyl substituted ammonium salt.

References Cited

UNITED STATES PATENTS

| | | | |
|---|---|---|---|
| 2,781,393 | 2/1957 | Heckert et al. | 260—464 |
| 3,278,514 | 10/1966 | Pauson et al. | 260—192 XR |
| 2,804,469 | 8/1957 | Westfahl | 260—464 |
| 2,923,694 | 2/1960 | Schmidt | 260—192 XR |
| 3,040,056 | 6/1962 | Williams | 260—464 XR |
| 3,066,148 | 11/1962 | Winstein | 260—464 XR |
| 3,125,584 | 3/1964 | Weis | 260—464 XR |
| 3,161,630 | 12/1964 | Phelisse et al. | 260—192 |

OTHER REFERENCES

Cookson et al. Proceedings of The Chemical Society (London) vol. of 1961, pp. 117 to 118.

Cookson et al. C.A. vol. 65, p. 18504 (1966).

FLOYD D. HIGEL, Primary Examiner

U.S. Cl. X.R.

8—4, 7, 13, 41, 50 23—63 44—1 117—138.8, 142, 143, 154, 37, 41, 42, 141, 149, 152, 153, 154, 162, 163, 429, 429.5, 429.7, 429.9, 430, 431, 435, 438, 438.1, 438.5, 439, 447, 448, 464, 465.8

UNITED STATES PATENT OFFICE
CERTIFICATE OF CORRECTION

Patent No. 3,536,694                Dated  October 27, 1970

Inventor(s)   Owen Wright Webster

It is certified that error appears in the above-identified patent and that said Letters Patent are hereby corrected as shown below:

Col. 1, line 20, delete the first comma;

Col. 3, line 57, insert " $\ominus$ " in center of second ring; line 60, " $\ominus$ " to -- $\oplus$ --; line 61, insert -- (II) -- under second structure;

Col. 4, line 15, delete "t" before "hydrogen";

Col. 5, line 27, change "9" to -- 8 --;

Col. 6, line 72, change "2" to -- 2' --;

Col. 7, line 38, insert -- -Cl -- in formula to agree with line 47 same formula;    of the same formula;

Col. 10, line 17, change "Berium" to -- Barium --;

Col. 13, line 74, insert -- ) -- after "parts";

Col. 14, line 50, change " -CH " to -- -CN --;

Col. 16, line 55, change "275" to -- 257 --;

Col. 17, line 48, insert -- 8.50 -- after "8.10,";

Col. 18, line 62, delete the period;

UNITED STATES PATENT OFFICE
CERTIFICATE OF CORRECTION

Patent No. 3,536,694     Dated October 27, 1970

Inventor(s) Owen Wright Webster     PAGE - 2

It is certified that error appears in the above-identified patent and that said Letters Patent are hereby corrected as shown below:

Col. 19, line 6, change "traeted" to -- treated --;

Col. 22, line 55, change "  " to --  --;

line 62, change "H$_2$O" to -- H$_2$N --;

Col. 24, line 9, delete "is"; line 10, change "tetracyano-" to -- tetracyano --; line 18, correct the spelling of -- determined --;

Col. 25, add, as a last line, -- and --;

Col. 26, lines 44-47, delete the entire formula (duplicate of lines 39-42); line 54, change "-CH" to -- -CN --;

Col. 29, line 35, change "Claim 33" to -- Claim 1 --;

Col. 30, line 7, change "
```
 N
 "
 N
 '
 Q'
```
" to --
```
 N
 "
 N
 '
 Q'
```
-- (to conform to formula in Col. 28, lines 4-11).

Signed and sealed this 8th day of August 1972.

(SEAL)
Attest:

EDWARD M. FLETCHER, JR.      ROBERT GOTTSCHALK
Attesting Officer     Commissioner of Patents